United States Patent [19]

Schuster

[11] Patent Number: 5,494,068
[45] Date of Patent: Feb. 27, 1996

[54] GAS LEAK SENSOR SHUTOFF VALVE AND METHOD FOR INSTALLATION

[75] Inventor: Yoel Schuster, Holon, Israel

[73] Assignee: Gas Guard West, Inc., Oakland, Calif.

[21] Appl. No.: 445,915

[22] Filed: May 22, 1995

[51] Int. Cl.$^6$ ................................................. F16K 17/28
[52] U.S. Cl. ......................... 137/460; 137/68.11; 251/151
[58] Field of Search ................................ 137/460, 68.11; 251/151

[56] References Cited

U.S. PATENT DOCUMENTS

| | | | |
|---|---|---|---|
| 4,257,448 | 3/1981 | Shiu et al. | 137/460 |
| 4,347,867 | 9/1982 | Peters | 137/460 |
| 4,809,740 | 3/1989 | Nevlud | 137/460 |

FOREIGN PATENT DOCUMENTS

| | | | |
|---|---|---|---|
| 2924533 | 1/1981 | Germany | 137/460 |

*Primary Examiner*—Stephen M. Hepperle
*Attorney, Agent, or Firm*—Howard Cohen

[57] ABSTRACT

A gas leak sensor shutoff valve includes a cylindrical body having a connector nipple secured in an inlet port and adapted to be secured to a gas supply pipe. An internal bore extends within the body and joins the inlet port in coaxial fashion. The internal end surface of the connector nipple includes a pair of diametrically opposed slots. A valve assembly is translatably disposed within a stepped valve chamber in the bore. The valve assembly includes a cylindrical sidewall closed at one end, and a pair of opposed holes extending through the sidewall. A gasket is secured to the closed end of the valve assembly, the periphery of the gasket extending outwardly from the valve assembly to impinge on an annular shoulder within the bore. A flow path extends from the connector nipple, through the slots in the internal end of the connector nipple, past the gap between the sealing gasket and the annular shoulder, and through the holes in the cylindrical sidewall to the distal end of the internal bore. An outlet passage extends diametrically in the valve body to join the distal end of the internal bore. An access port may be provided in the valve body in diametrical opposition to the outlet passage. A reset mechanism includes a spindle translatably disposed in the distal end of the internal bore and a pin extending from the spindle to impinge on the valve assembly and urge the gasket away from the annular shoulder. The valve is configured to replace the T connector of a standard gas line setup, function ally as well as spatially. A breakaway nipple may be secured between the outlet connector of the valve and the customer delivery pipe to be the first point to break in the event of earthquake or the like.

21 Claims, 7 Drawing Sheets

Figure_1

Figure_2

Figure_3

Figure_4

Figure_5

Figure_6

Figure_7

Figure_8

PRIOR ART

Figure_9

Figure_10

GAS LEAK SENSOR SHUTOFF VALVE AND METHOD FOR INSTALLATION

BACKGROUND OF THE INVENTION

The present invention generally relates to gas flow control valves, and more particularly to gas valves installed in gas supply lines to stop the flow of gas in the event of a leak in the supply line.

Gas-fired appliances using fuels such as methane, butane, propane, or combinations thereof are commonly used throughout the world. Although such appliances and the systems that supply fuel to them are well-developed and thoroughly engineered, there exists a small but significant chance for a malfunction to cause a catastrophic accident. Gas leaks in the appliance or the supply system can and do cause deadly fires and explosions every year. Many of these incidents could be prevented through greater exercise of caution and vigilance, while other accidents caused by mechanical failure, broken supply pipes, and the like could be prevented by the use of gas leak sensor shutoff valves. However, gas leak sensor shutoff valves are not in widespread use.

In populous areas of the world where geological fault lines are known and seismic events are common, it is recognized that gas supply lines are very vulnerable to earth tremors and shifting. It is also known that the major destructive effect of many earthquakes has been firestorms caused by the abundance of fuel leaking from broken gas pipes and the related lack of water supply for extinguishing fires. Again, gas leak sensor shutoff valves could ameliorate this potential for catastrophe, but such valves are not in widespread use. Seismic sensor valves, which shut off gas flow in response to a seismic event, have been installed in a few buildings, and their use has been generally unsuccessful. Seismic events may trigger the valve to stop the gas flow, even though the gas system is undamaged and remains intact. As a result, the gas system is interrupted and rendered inoperative for no valid reason. Moreover, seismic sensor valves may be triggered by non-seismic vibrations, such as sonic booms, shaking caused by the near passage of very heavy vehicles, and the like. It is then necessary to relight all pilot flames, and to reset the associated pilot valves. Most homeowners and building dwellers cannot carry out these tasks themselves, and must pay a skilled tradesman for the service.

Seismic sensing valves tend to be expensive, due to design complexity, and the cost itself is a negative incentive for widespread use. In addition, seismic sensing valves are generally installed by being secured to a wall of the building or dwelling being protected, and the valve must be precisely leveled to be effective. The gas piping must then be routed through the valve, and the added pipe and connectors, as well as the labor for the wall installation, leveling, and pipe make-up comprise a significant additional cost factor. It is not surprising, considering the false triggering problems and the high cost, that seismic sensing valves are not widely used.

Gas leak sensor shutoff valves are known in the prior art, as exemplified in Israel patent no. 96312, issued to the present inventor. Such devices are effective in distinguishing between nominal gas flow for appliance use and exceptionally high gas flow due to a leak in the gas supply system or gas-fired appliance. Such devices could be more widely exploited if they are made to be as simple, effective, and inexpensive as possible.

SUMMARY OF THE INVENTION

The present invention generally comprises an improved gas leak sensor valve that detects a gas leak in a building gas supply or a gas line to a gas-fired appliance, and shuts off the gas flow immediately. Thus the valve reliably distinguishes between normal gas flow and abnormally high gas flow due to a leak. The valve is extremely simple in construction, so that it is inexpensive to manufacture and install. Moreover, the valve is designed to be installed directly into the existing gas pipe arrangement with a minimum of labor and materials, so that total cost of purchase and installation is sufficiently low to provide a positive incentive for widespread use.

The gas leak sensor valve includes a generally cylindrical valve body provided at one end with an inlet port having internal threads. A connector nipple is secured in the inlet port with a O-ring seal, and includes an externally threaded end adapted to be secured to a gas supply pipe or the like. An internal bore extends within the valve body and joins the inlet port in generally coaxial fashion. The internal end of the connector nipple is provided with a pair of diametrically opposed slots formed in the end surface thereof.

A stepped valve chamber is defined within a medial portion of the bore. Within the valve chamber, a valve element assembly is translatably disposed in the axial direction of the bore. The valve element assembly comprises a cup-like member having a cylindrical sidewall closed at one end, and a pair of diametrically opposed holes extending through the sidewall. A flexible gasket is secured to the closed end of the valve element., and the periphery of the gasket extends radially outwardly from the cylindrical sidewall of the valve element.

The cylindrical sidewall is dimensioned to be received in a narrow portion of the stepped valve chamber with minimal clearance for free axial translation. The periphery of the gasket has a diameter sufficient to impinge in sealing fashion on the annular shoulder of the narrow portion of the valve chamber. The cylindrical sidewall of the valve element is generally partially extended into the narrow portion of the valve chamber, and a flow path is established from the connector nipple, through the diametrically opposed slots in the internal end of the connector nipple, past the gap between the sealing gasket and the annular shoulder, and through the diametrically opposed holes in the cylindrical sidewall to the distal end of the internal bore.

An outlet passage extends diametrically in the valve body, joining the distal end of the internal bore in fluid flow communication. The outlet passage extends through a neck extending radially from the valve body, and an internally threaded coupling is rotatably secured to the neck. An access port may be provided in the valve body in diametrical opposition to the outlet passage.

Secured in the distal end of the valve body is a reset mechanism, comprised of an spindle translatably disposed in the distal end of the internal bore and a pin extending from the spindle into the valve chamber. A compression spring is disposed about the spindle to bias the reset mechanism to translate distally, and the outer portion of the spindle is provided with a button end. A threaded nut retains the spindle within the bore, and a second O-ring seal is secured to the spindle to prevent gas flow past the spindle.

The gas leak sensor valve is installed directly into a gas service line supplying a plurality of appliances, or in a branch line supplying a single appliance. The cylindrical valve body is oriented generally upright, with the axis thereof ±30° to vertical. The gas flows into the connector nipple, through the flow path described above, and out of the outlet passage to the appliance(s) downstream of the valve. In normal operation, the weight of the valve assembly causes it to translate toward the lower (inlet) end of the valve chamber, so that gas flow is uninterrupted. However, should a gas leak occur downstream of the gas leak sensor valve, there will occur a surge in gas flow through the valve. The increased flow will exceed the limited flow capacity of the flow path, causing a net pressure differential across the valve assembly. The pressure differential urges the valve assembly distally, driving the gasket of the valve assembly into impingement with the shoulder of the valve chamber and shutting off all gas flow. The effective capacity of the flow path is selected so that the valve is sensitive to a flow rate that is only marginally higher than the consumption rate of the gas appliance (or the like) downstream of the valve. Thus a leak of only modest proportions, which might otherwise cause gas accumulation and explosive conditions within an enclosed space, is prevented.

To reset the valve and return to normal operating conditions, it is generally necessary to manually depress the button end of the spindle. The spindle translates against the resilient bias of the compression spring, and the pin translates proximally to impinge on the valve assembly, urging the valve assembly proximally and reopening the flow path. When the button end is released, the spring drives the spindle distally, and the valve is once again disposed to permit normal gas flow and to detect any significant gas leak.

In another aspect, the invention comprises a gas leak sensor valve having an outer configuration and dimensions selected so that the valve may be interposed in a typical gas service line arrangement with a minimum of additional parts and installation labor. A gas service line from a utility gas main usually comprises (in series) a feeder pipe from the main, a manual service shutoff valve, a pressure regulator, a meter to determine gas usage, a riser from the meter, a T connector joined to the riser, and a delivery pipe extending from the T connector into the customer premises. One port of the T connector is plugged, and is used only rarely to gain access to the customer side of the setup to permit testing of the gas pressure downstream of the meter at the customer premises.

The configuration of the gas leak sensor valve of the invention is designed to replace the T connector of a standard gas line setup, function ally as well as spatially. The standard T connector and/or riser extending out of the gas meter may be removed, and the valve of the invention placed directly in their stead. The swivel connector at the outlet end of the valve is significant in permitting this direct substitution. The simplicity of this emplacement reduces installation costs to a minimum, with few or no additional parts and only a few minutes of labor required. The plugged port opposite the outlet port of the valve takes the place of the plugged port of the old T connector. Also, the entire installation process takes place exteriorly of the building, so that entry into occupied interior space is not necessary. Moreover, unlike prior seismic sensing valves, there is no need to anchor the gas leak sensing valve of the invention to the building structure itself; rather, it is interposed in the gas service line piping, which also serves to support the valve.

In another aspect of the invention, there is provided a breakaway nipple secured between the outlet connector of the gas leak sensor valve and the delivery pipe extending into the customer premises. The breakaway nipple is a designated weak point in the delivery pipe network, and is provided to be the first point in the delivery pipe network to fracture or shatter in the event of an earthquake or other occurrence that causes displacement between the premises and the gas meter. The placement of the breakaway nipple directly adjacent to gas leak sensor valve assures that any damage to the customer delivery pipe network will occur as close to the sensor valve as possible, where it is most easily detected. It is also significant that the breakaway nipple is located exteriorly of the building. Of course, damage to the gas delivery pipe network downstream of the breakaway nipple will also trigger operation of the sensor valve to shut off gas flow.

DESCRIPTION OF THE PREFERRED EMBODIMENT

Figure 1:
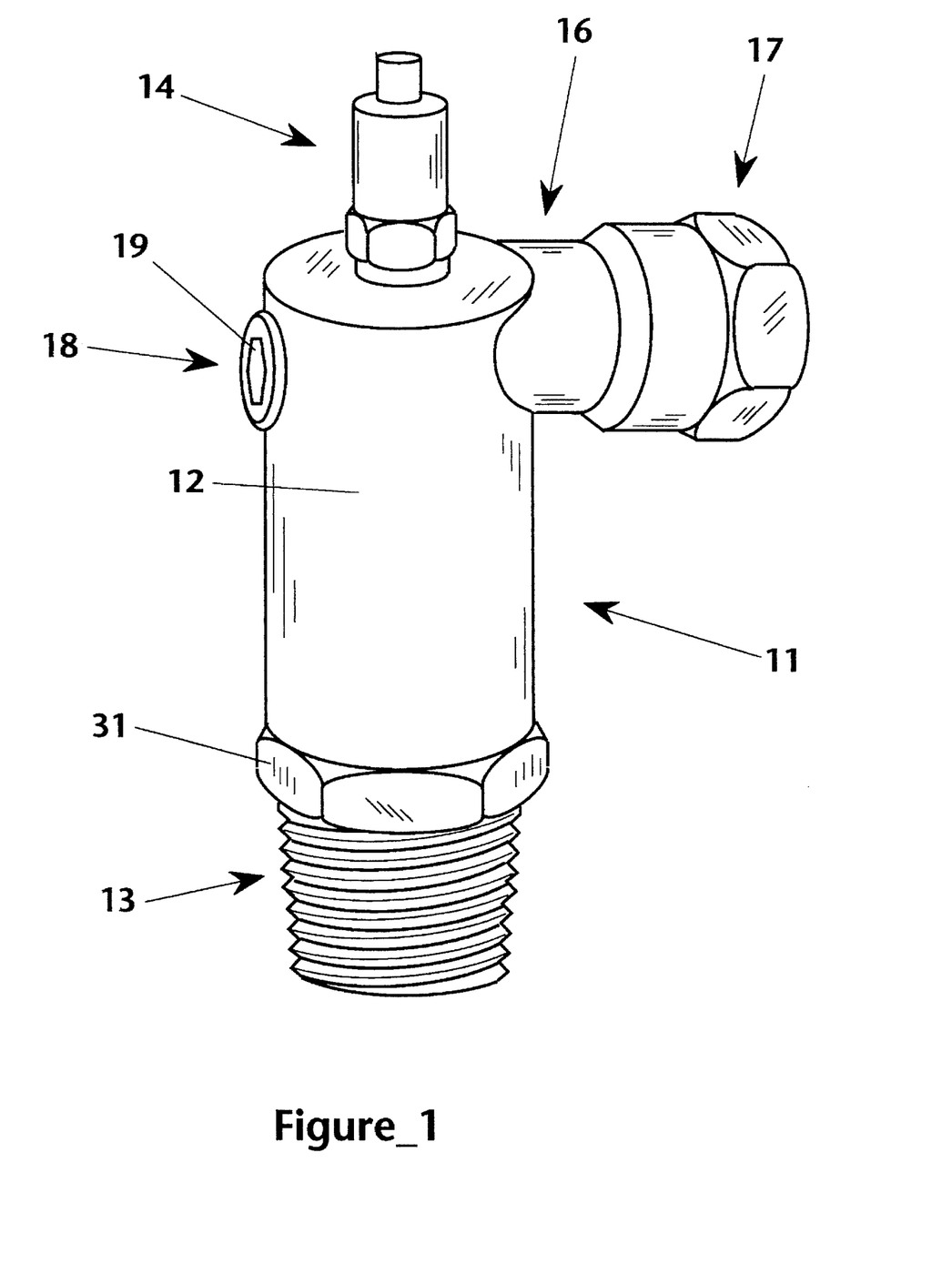
FIG. 1 is a perspective of one embodiment of the gas leak sensor shutoff valve of the present invention.
Figure 2:
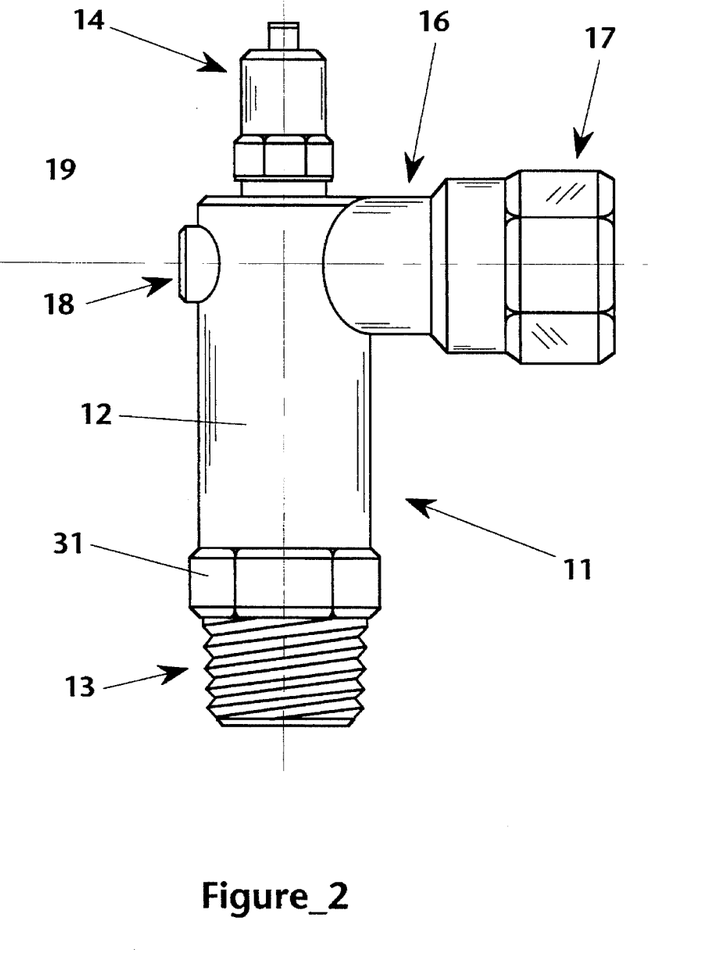
FIG. 2 is a plan elevation of the gas leak sensor shutoff valve as shown in FIG. 1.
Figure 3:
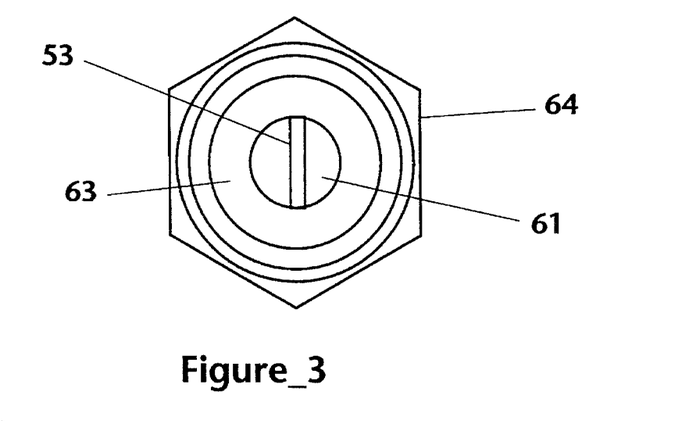
FIG. 3 is an end view of the outlet port of the gas leak sensor shutoff valve.

The present invention generally comprises an improved gas leak sensor valve that detects a gas leak in a building gas supply or a gas line to a gas-fired appliance, and shuts off the gas flow immediately. With regard to FIGS. 1 and 2, the gas leak sensor valve 11 generally includes a cylindrical valve body 12 having a male threaded connection 13 extending from the lower end thereof and a reset mechanism 14 extending from the upper end. A cylindrical neck 16 extends radially from an upper end portion of the body 12, and includes a rotatable coupler 17 secured thereto. An optional access port 18 is disposed in diametrical opposition to the neck 16, and is sealed by a threaded plug 19.

Figure 4:
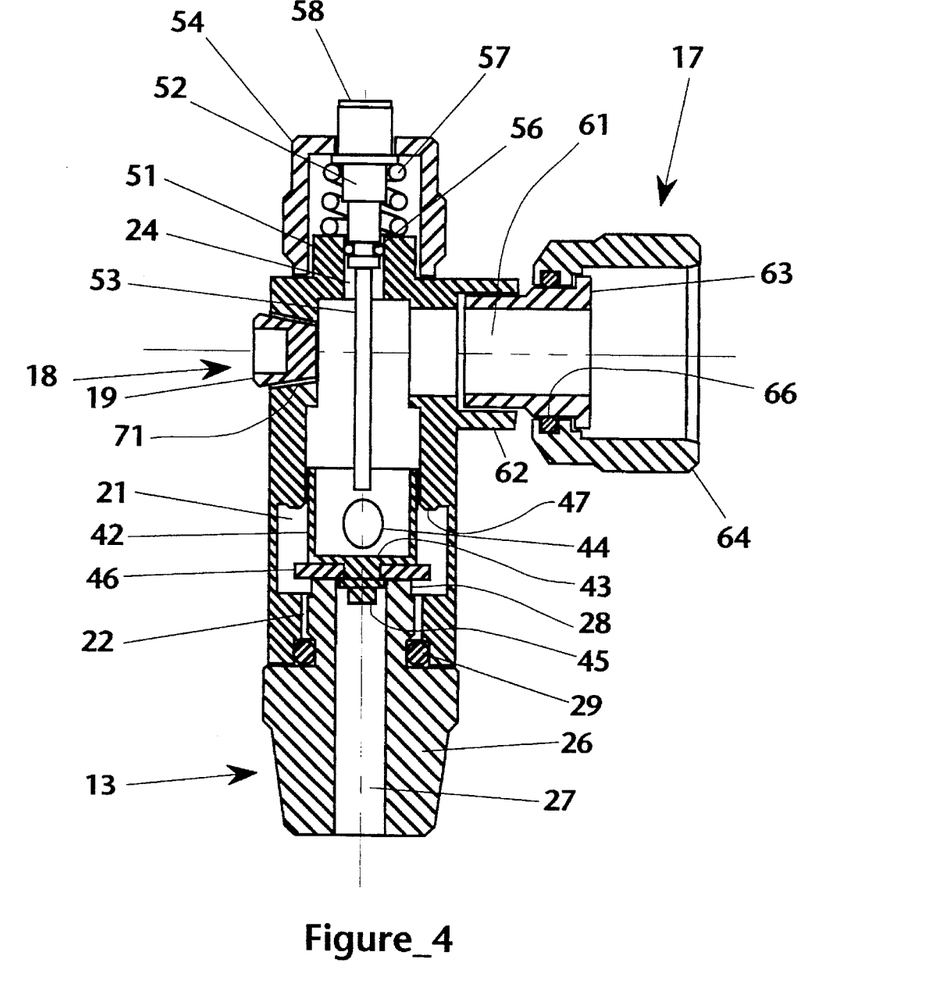
FIG. 4 is a cross-sectional elevation of the gas leak sensor shutoff valve shown in FIGS. 1–3.
Figure 5:
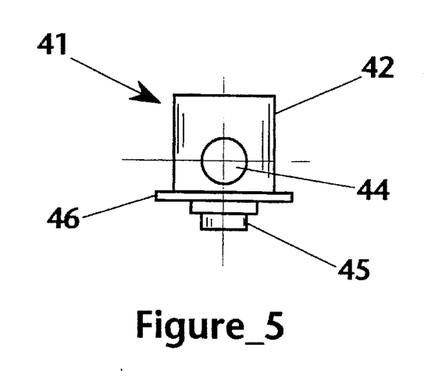
FIG. 5 is a plan view of the valve element assembly of the invention.
Figure 6:
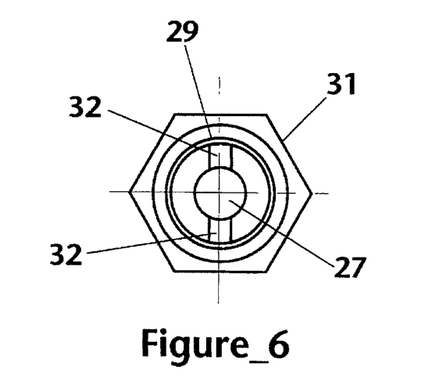
FIG. 6 is an internal end view of the connector nipple of the invention.

With regard to FIGS. 4–6, the valve body 12 includes an interior bore 21 extending coaxially therethrough. The bore 21 is stepped to define different portions, including an internally threaded proximal end portion 22, a medial valve chamber 23, and a narrow distal portion 24. A connector nipple 26 is provided with an interior end having male threads 28 adapted to be secured in the threaded portion 22 of the bore 21. The nipple 26 includes an O-ring seal 29 at the base of the threaded portion 28 which is adapted to form a leakproof seal at the proximal opening of the bore 21. A central bore 27 extends axially through the nipple 26, and an exterior hex-sided portion 31 is provided for standard wrench engagement. At the interior end of the nipple 26, a pair of diametrically oriented slots 32 are formed in the end surface. More slots 32 may be provided in accordance with the designed flow rate through the valve 11, as will be explained below.

The invention further includes a valve element assembly 41, shown particularly in FIGS. 4 and 5. The valve element assembly 41 comprises a cup-like member having a cylindrical sidewall 42 closed at one end by an end wall 43. A pair of diametrically opposed holes 44 are formed in the sidewall 42 adjacent to the end wall 43. More than two holes 44 may be provided as required, in accordance with the designed gas flow rate through the valve 11. A disc-like flexible gasket 46 is secured by end assembly 45 to the valve element impinging on the end wall 43 with the periphery of the gasket extending radially outwardly to overhang the sidewall 42. The cylindrical sidewall 42 is dimensioned to be received in the stepped valve chamber 23 with minimal clearance for freely sliding axial translation. The periphery of the gasket 46 has a diameter sufficient to impinge in sealing fashion on the annular shoulder 47 that defines the valve chamber 23. The end assembly 45 is dimensioned to be received within the interior end of the bore 27, so that the gasket 46 may impinge on the end surface of the connector nipple 26. Thus the valve element assembly is adapted to translate axially from a lower position in which the gasket impinges on the inner end of the connector nipple 26 to an upper position in which the gasket impinges on the annular shoulder 47.

The reset mechanism 14 is comprised of an externally threaded neck 51 extending distally and axially from the cylindrical valve body 12. A spindle 52 extends into the distal end opening of the bore 21 with minimal clearance for freely sliding translation. Extending axially and proximally from the spindle 52 is a pin 53, the lower end thereof extending within the cylindrical sidewall of the valve element assembly 41. A threaded nut 54 retains the spindle 52 within the bore, and a second O-ring seal 56 is secured to the spindle to prevent gas flow past the spindle. A compression spring 57 is disposed about the spindle 52 to bias the reset mechanism to translate distally, and the outer portion of the spindle is provided with a button end 58 to facilitate manual engagement.

The invention further includes an outlet passage 61 extending diametrically in the valve body, joining a distal portion of the internal bore 21 in fluid flow communication. The outlet passage 61 extends through a neck 62 protruding radially from the valve body 12, and a tubular member 63 is secured in the neck 62. An internally threaded coupling nut 64 is permanently secured to the member 63, and an O-ring seal 66 forms a leakproof union between the nut 64 and member 63.

As an optional feature, the access port 18 comprises a tapped access hole 71 formed in the valve body 12 and disposed in diametrical opposition to the outlet passage 61. The threaded plug 19 is secured in the hole 71 to seal the port, which may be opened for purposes to be described below.

With the valve 11 installed in series in a gas supply pipe, and oriented generally vertically (±30°) as shown in FIG. 4, the valve element assembly 41 is disposed at the lower end of the valve chamber 23, with the gasket 46 impinging on the inner end surface of the connector nipple 26. With regard to FIG. 7, a gas flow path is established through the valve 11. The flow path extends from the bore 27 of the nipple 26, through the diametrical slots 32 at the end of the nipple 26 and into the valve chamber 23, thence through the holes 44 of the cylindrical sidewall 42 and into the interior of the cup-like valve element assembly, Gas then flows toward the distal end of the bore 21, and out of the outlet passage 61 to the pipe connected to the nut 64. There is no preferred angular alignment or orientation between the slots 32 and the holes 44.

Figure 7:
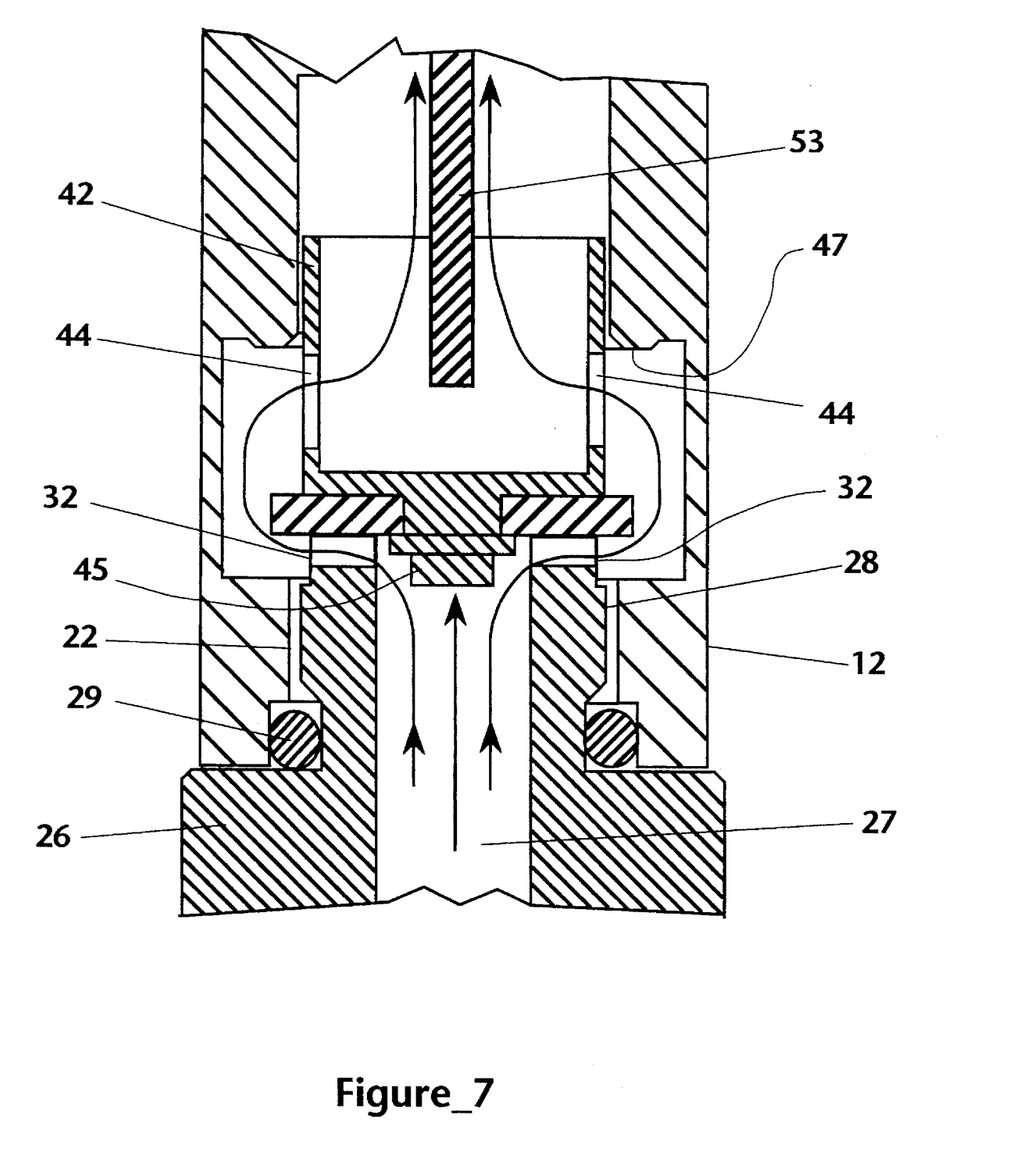
FIG. 7 is a magnified cross-sectional elevation of the gas flow path with respect to the valve element assembly of the invention.

It may be appreciated that the flow path through the slots 32 and the holes 44 has an effective cross-sectional area that is substantially less than the remainder of the flow path through the valve 11. The effective cross-sectional area (which may be determined empirically or calculated dimensionally) establishes a threshold flow rate below which there is no significant constraint on the gas flow. This threshold flow rate is determined to be the maximum expected gas draw for the installation at the standard regulated gas supply pressure, whether the draw comprises the rated consumption of a single gas appliance or multiple appliances of an entire premises. When the gas flow approaches the threshold flow rate, the limited effective cross-sectional area will cause a net pressure differential across the valve element assembly. The pressure differential urges the valve assembly distally and upwardly, countering the weight of the valve assembly and causing the valve assembly to "float" on the gas stream. Thus the relationship of the mass of the valve assembly to the effective cross-sectional flow area is significant in determining the threshold flow rate of the system. The mass is primarily a function of the material and thickness of the sidewall 42 and end wall 43, and the effective cross-sectional flow area is primarily a function of the number and width of the slots 32, as well as the number and diameter of the holes 44 in the sidewall 42.

Figure 8:
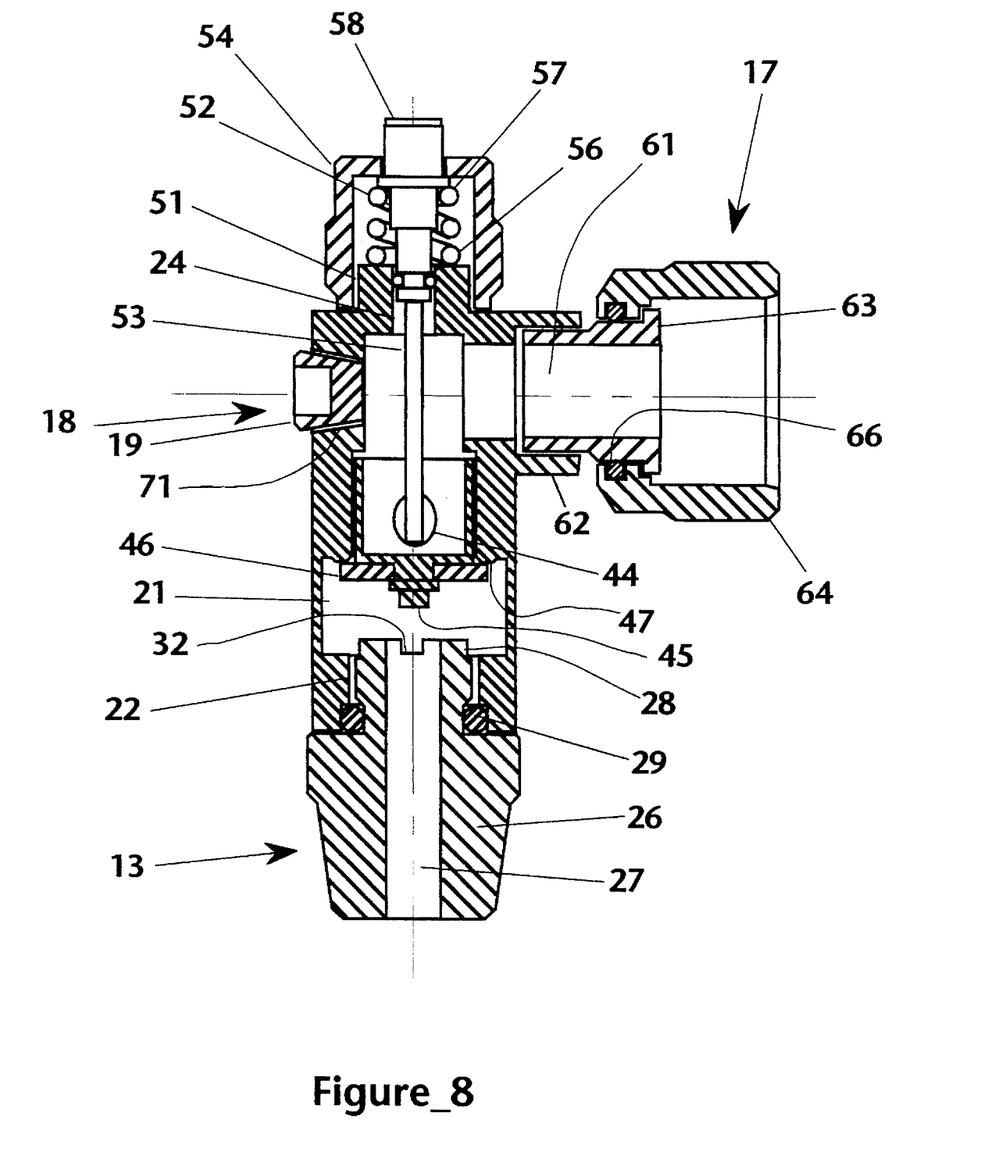
FIG. 8 is a cross-sectional elevation of a further embodiment of the gas leak sensor shutoff valve of the invention.

As the gas flow exceeds the threshold flow rate, the valve assembly 41 is urged upwardly into the upper end of the valve chamber. The holes 44 in the sidewall 42 become partially occluded by the adjacent annular shoulder 44, thus further constricting the flow capacity and increasing the pressure differential across the valve assembly. The valve assembly 41 is urged upwardly more forcefully, and this feedback effect quickly accelerates the valve assembly 41 upwardly to the point where the gasket 46 impinges on the annular shoulder 44, shutting off all flow through the valve 11 (FIG. 8). The feedback effect assures that the valve element will not remain stable in a position where it significantly constricts gas flow to appliances downstream of the valve 11. Gas pressure below the valve assembly 41 maintains the shutoff condition.

To reopen the valve 11 for gas flow therethrough, the button end 58 of the reset mechanism 14 is manually depressed, urging the pin 53 to impinge on the end wall 43 of the valve element 41 and driving it downwardly in the valve chamber 23. The button end 58 is released to permit the reset mechanism to retract, and the flow path described with respect to FIG. 7 is reestablished. However, if the leak (or other condition) that has caused the valve to close remains unchecked, the valve will immediately close once again.

Figure 9:
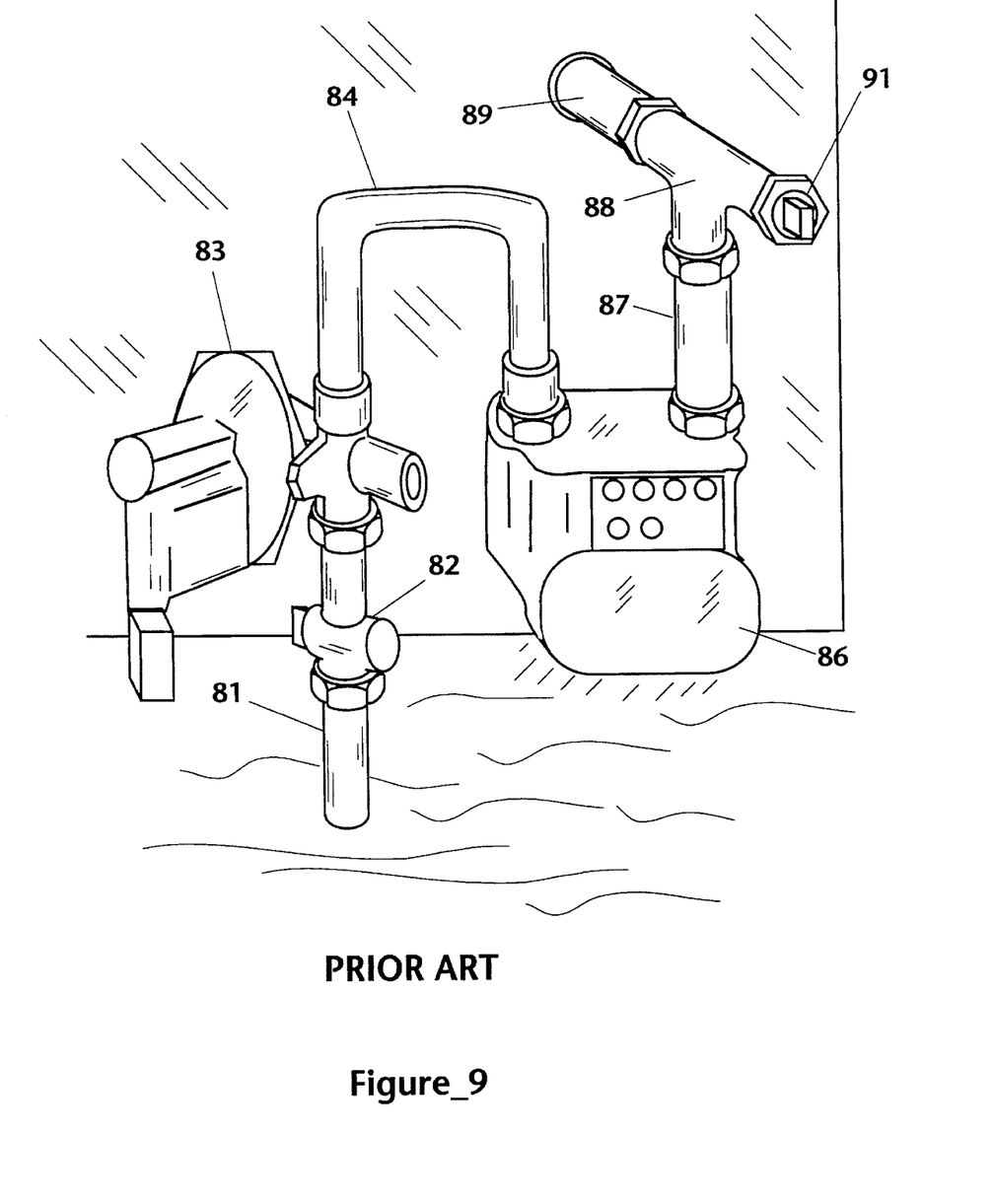
FIG. 9 is a perspective rendering of a typical gas utility supplier connection arrangement to a customer premises.

Another important aspect of the gas leak sensor valve 11 is that it is provided with an outer configuration and dimensions that facilitate its installation in a typical gas service line arrangement with the least amount of additional parts and installation effort. With regard to FIG. 9, a typical prior art gas service connection includes a riser pipe 81 extending upwardly from ground level and connected below to a utility gas main. Joined to the riser pipe in series are a manual shutoff valve 82 and a pressure regulator 83, which reduces the pressure from main pressure (typically in tens of pounds per square inch) to customer supply pressure (typically less than one pound per square inch). A U-shaped pipe 84 (or pipe assembly) connects the pressure regulator output to a meter 86 which measures gas consumption. Extending from the meter is a short riser pipe 87 which joins a T connector 88. The T connector includes one end which is joined to the pipe 89 which supplies all the gas-consuming appliances in the customer premises. The other end 91 of the T connector 88 is sealed by a threaded plug, and is openable to permit testing of the gas pressure on the customer side of the meter 86. The components of FIG. 9 are often arranged as depicted, or similarly thereto, as most gas utility companies specify standard dimensions and spacings for the components.

Figure 10:
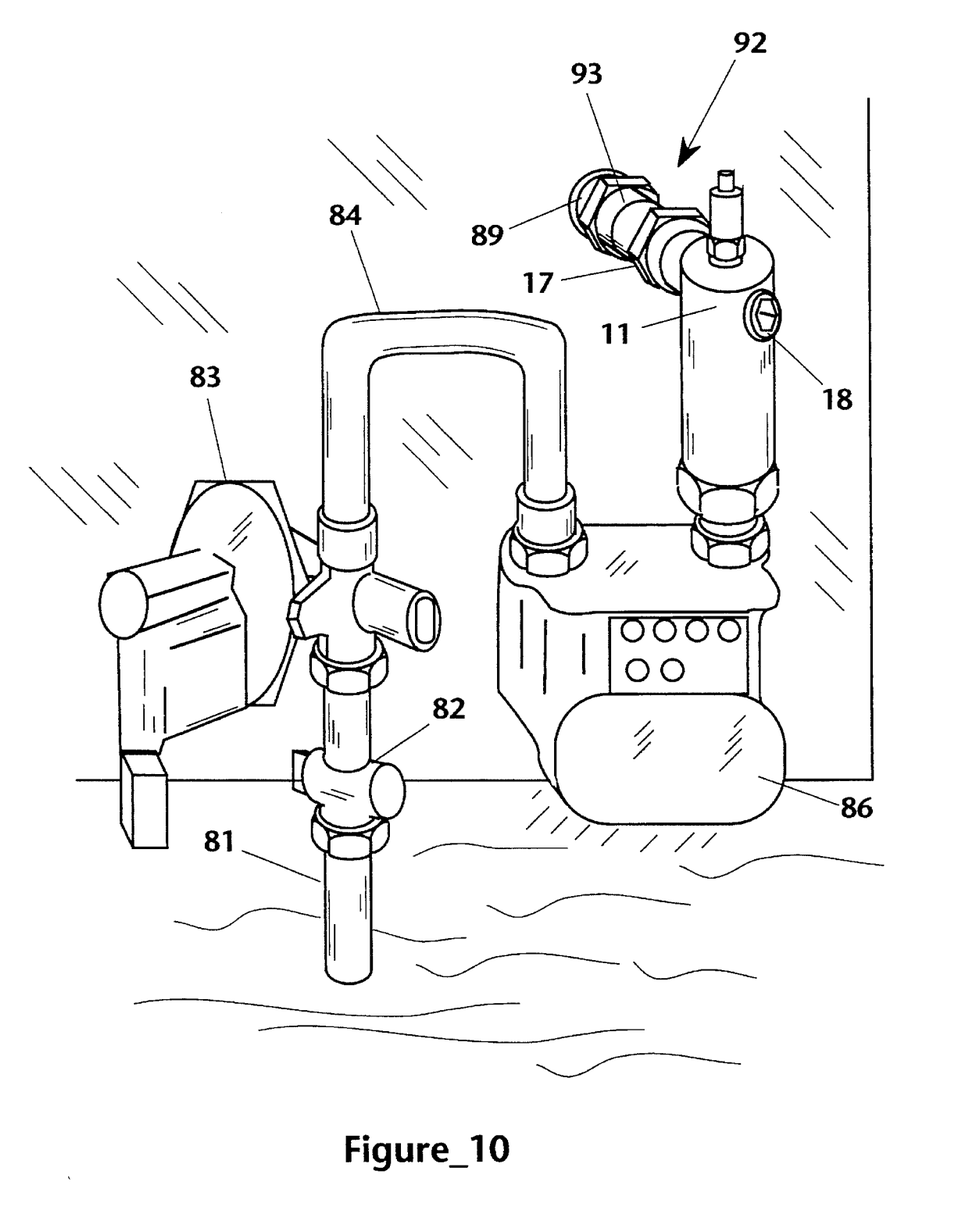
FIG. 10 is a perspective rendering as in FIG. 9, showing the installation of the gas leak sensor shutoff valve in a typical gas utility supplier connection arrangement to a customer premises.

With regard to FIG. 10, the gas sensor shutoff valve 11 of the invention is particularly configured to be connected between the gas meter 86 and the customer supply pipe 89. That is, the installation of the valve 11 proceeds by first removing the riser pipe 87 and the T connector 88, and substituting the valve 11 directly for these two components. The threaded end 13 is secured to the coupling nut atop the meter 86, and the threaded end of the pipe 89 is secured to the rotatable coupling 17 of the valve. This installation process requires only a few minutes labor, and minimal tools and materials. The savings in material and labor costs, together with the economical construction of the valve, provide the maximum protection for the premises at a minimal cost.

It may be appreciated that the plugged port 18 of the valve 11 provides the access function of the replaced port 91 of the old T connector 88. The port 18 may be opened when required to measure the pressure of gas entering the customer premises pipe 89, so that the meter 86 and the pressure regulator 83 may be adjusted when necessary.

In a further aspect of the invention, the installation of the valve 11 may also include the interposition of a breakaway nipple 92 between the outlet of the valve and the customer supply pipe 89. The breakaway nipple may comprise a short straight union having an annular groove 93 formed in the sidewall thereof. The groove 93 extends through the pipe sidewall a sufficient distance to weaken the sidewall and render it more vulnerable to fracture from seismic shaking and earth movement than other, stronger portions of the pipe 89 and its related branches downstream of the valve 11. Thus, in the event of earthquake or earth movement, or damage to the premises due to hurricane, tornado, flood, and the like, the portion of the gas service most likely to fracture first will be the breakaway nipple 92. The break will be disposed closely adjacent to the valve 11, where it is most easily detected. Moreover, the break is located exteriorly of the premises, whereby the interior of the premises is offered greater protection from minor gas leaks and gas accumulation. Of course, it is less likely but still possible that damage will first occur to the gas delivery pipe network downstream of the breakaway nipple, which will likewise trigger operation of the sensor valve to shut off gas flow.

The valve 11 has been described as being configured for installation adjacent to and downstream of the gas consumption meter 86, and as such it may be provided with couplings 13 and 17 that typically have ¾ inch or one inch NPT threads. In addition, the valve 11 may be configured for interposition farther downstream in the customer supply system, for example where branch lines connect to the pipe 89, or where branch line connect to the appliances that they supply. In these latter instances, the valve 11 may be manufactured with the access port 18 omitted, and either or both of the couplings 13 and 17 may be provided with ½ inch NPT threads, rather than the ¾ inch NPT threads. The effective cross-section of the flow path through the valve may also be reengineered so that the threshold flow level (described above) is slightly greater than the expected gas draw to a particular appliance or through the branch line. A plurality of models of the valve 11 may be manufactured, each model having a defined threshold flow level appropriate for typical consumption rates of gas fired appliances.

I claim:

1. A gas leak sensor shutoff valve for use in a gas supply line, including;

a valve body having an internal bore extending therethrough in an axial direction;

first connector means joined to a first end of said bore and adapted to connect to a pressurized gas supply;

outlet passage means connected to a second end of said internal bore, and second connector means joined to an outer end of said outlet passage means and adapted to connect to a gas delivery system;

valve chamber means disposed in a medial portion of said internal bore;

a valve assembly disposed in said valve chamber, said valve assembly including an annular gasket dimensioned to form a seal with an annular shoulder in said valve chamber;

a gas flow path extending from a pressurized gas supply through said first connector means to said valve chamber, around and through said valve assembly, and through said outlet passage to a gas delivery system;

said valve assembly adapted to translate axially in said valve chamber from a first position in which said flow path is open to a second position in which said flow path is blocked;

means for defining a threshold gas flow rate below which said valve assembly remains in said first position and above which said valve assembly is driven by said gas flow to translate to said second position and block said gas flow; and an access port extending in said valve body from the exterior thereof to said bore, said access port generally disposed in diametrical opposition to said outlet passage means.

2. The gas leak sensor shutoff valve of claim 1, wherein said first connector means includes a first member having a first connector bore and an interior end extending into said valve chamber.

3. The gas leak sensor shutoff valve of claim 2, wherein said valve assembly includes a cylindrical sidewall closed at one end by an end wall in cup-like fashion, said sidewall dimensioned to be received within a portion of said valve chamber with minimal clearance for freely sliding translation therein.

4. The gas leak sensor shutoff valve of claim 3, wherein said annular gasket is secured to said valve assembly directly adjacent to said end wall, said annular gasket having a periphery protruding radially outwardly at the end of said cylindrical sidewall.

5. The gas leak sensor shutoff valve of claim 4, wherein said means for defining a threshold gas flow rate includes at least one slot formed in said interior end of said first member to admit gas flow into said valve chamber.

6. The gas leak sensor shutoff valve of claim 5, wherein said means for defining a threshold gas flow rate further includes at least one hole formed in said cylindrical sidewall of said valve assembly.

7. The gas leak sensor shutoff valve of claim 6, wherein said gas flow path extends from said first connector means through said at least one slot in said interior end of said first member, around said annular gasket, through said at least one hole in said cylindrical sidewall, and through said outlet passage.

8. The gas leak sensor shutoff valve of claim 7, wherein said annular gasket impinges on said interior end of said first member when said valve assembly is disposed in said first position.

9. The gas leak sensor shutoff valve of claim 8, wherein said annular gasket impinges on said annular shoulder of said valve chamber when said valve assembly is disposed in said second position.

10. The gas leak sensor shutoff valve of claim 1, further including reset means for manually urging said valve assembly to translate from said second position to said first position.

11. The gas leak sensor shutoff valve of claim 10, wherein said reset mechanism includes a spindle slidably secured in said second end of said bore, and a pin extending from said spindle toward said valve assembly.

12. The gas leak sensor shutoff valve of claim 11, further including a button formed on an outer end of said spindle, and further including spring means for biasing said spindle to translate outwardly from said second end of said bore.

13. The gas leak sensor shutoff valve of claim 1, wherein said second connector means includes a neck portion extending from said valve body and disposed radially with respect to said axis, and a threaded nut rotatably secured to said neck portion.

14. The gas leak sensor shutoff valve of claim 1, further including an access port extending in said valve body from the exterior thereof to said bore, said access port generally disposed in diametrical opposition to said outlet passage means.

15. The gas leak sensor shutoff valve of claim 1, wherein said access port includes interior threads, and further including a plug having complementary exterior threads to be secured in sealing relationship in said access port.

16. The gas leak sensor shutoff valve of claim 1, wherein said first connector means includes a connector nipple having an outer end provided with external threads, and an internal end extending into said valve chamber.

17. The gas leak sensor shutoff valve of claim 9, further including reset means for manually urging said valve assembly to translate from said second position to said first position.

18. The gas leak sensor shutoff valve of claim 17, wherein said second connector means includes a neck portion extending from said valve body and disposed radially with respect to said axis, and a threaded nut rotatably secured to said neck portion.

19. The gas leak sensor shutoff valve of claim 18, further including an access port extending in said valve body from the exterior thereof to said bore, said access port generally disposed in diametrical opposition to said outlet passage means.

20. The gas leak sensor shutoff valve of claim 1, wherein said internal bore is oriented generally vertically ±30°.

21. The gas leak sensor shutoff valve of claim 1, wherein said valve body, said neck, and said access port define a T configuration dimensioned to replace a T connector in a standard gas utility service arrangement for a customer premises.

\* \* \* \* \*